(12) United States Patent
Higashi et al.

(10) Patent No.: US 11,845,226 B2
(45) Date of Patent: Dec. 19, 2023

(54) ADDITIVE MANUFACTURING NOZZLE AND ADDITIVE MANUFACTURING DEVICE

(71) Applicant: Mitsubishi Hitachi Power Systems, Ltd., Yokohama (JP)

(72) Inventors: Kei Higashi, Tokyo (JP); Kazuhiro Yoshida, Tokyo (JP); Yoshinao Komatsu, Tokyo (JP); Takanao Komaki, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 462 days.

(21) Appl. No.: 16/756,667

(22) PCT Filed: Oct. 30, 2018

(86) PCT No.: PCT/JP2018/040346
§ 371 (c)(1),
(2) Date: Apr. 16, 2020

(87) PCT Pub. No.: WO2019/088105
PCT Pub. Date: May 9, 2019

(65) Prior Publication Data
US 2020/0261975 A1    Aug. 20, 2020

(30) Foreign Application Priority Data
Oct. 31, 2017    (JP) .................. 2017-210659

(51) Int. Cl.
*B29C 64/364*    (2017.01)
*B22F 3/105*    (2006.01)
(Continued)

(52) U.S. Cl.
CPC ............ *B29C 64/364* (2017.08); *B05B 1/005* (2013.01); *B05B 1/3402* (2018.08); *B22F 3/105* (2013.01);
(Continued)

(58) Field of Classification Search
CPC ....... B05B 1/005; B05B 1/3402; B05B 1/048; B29C 64/364; B22F 10/28; B22F 12/70;
(Continued)

(56) References Cited

U.S. PATENT DOCUMENTS 3,960,239 A * 6/1976 Frochaux ............... F16L 55/02
138/40
5,893,179 A * 4/1999 Johnson ............... B05B 17/085
4/507
(Continued)

FOREIGN PATENT DOCUMENTS

JP    2003-205256    7/2003
JP    2015-078434    4/2015
(Continued)

OTHER PUBLICATIONS

International Search Report dated Jan. 22, 2019 in International (PCT) Application No. PCT/JP2018/040346, with English Translation.
(Continued)

*Primary Examiner* — Cody J Lieuwen
(74) *Attorney, Agent, or Firm* — Wenderoth, Lind & Ponack, L.L.P.

(57) ABSTRACT

An additive manufacturing nozzles includes a header (41) extending in a width direction of the chamber and which is configured to be supplied with inert gas from the outside, and a nozzle body (43) connecting with the header (41) in the width direction and is configured to horizontally blow out the inert gas, which is supplied from the header, to a molding area. The nozzle body has a honeycomb part (52) which defines an inside of the nozzle body into flow channels through which the inert gas flows, a blowout part (55) disposed downstream of the honeycomb part and which is connected with the honeycomb part in the width direction. The inert gas passed through the plurality of flow channels
(Continued)

is led from the honeycomb part to the blowout part, and a porous part (54), which has openings, is disposed between the honeycomb part and the blowout part.

8 Claims, 4 Drawing Sheets

(51) Int. Cl.
| | |
|---|---|
| *B22F 3/16* | (2006.01) |
| *B05B 1/00* | (2006.01) |
| *B05B 1/34* | (2006.01) |
| *B22F 10/28* | (2021.01) |
| *B22F 12/70* | (2021.01) |
| *B05B 1/04* | (2006.01) |
| *B33Y 10/00* | (2015.01) |
| *B33Y 30/00* | (2015.01) |

(52) U.S. Cl.
CPC ............... *B22F 3/16* (2013.01); *B22F 10/28* (2021.01); *B22F 12/70* (2021.01); *B05B 1/048* (2013.01); *B22F 2998/10* (2013.01); *B33Y 10/00* (2014.12); *B33Y 30/00* (2014.12)

(58) Field of Classification Search
CPC ........ B22F 3/105; B22F 3/16; B22F 2998/10; B33Y 10/00; B33Y 30/00
USPC ....................... 239/590–590.5, 103
See application file for complete search history.

(56) References Cited

U.S. PATENT DOCUMENTS

| | | | |
|---|---|---|---|
| 6,170,094 B1* | 1/2001 | Weise | E04H 4/14 |
| | | | 4/678 |
| 7,731,107 B2* | 6/2010 | Grether | B05B 1/18 |
| | | | 239/553.3 |
| 8,561,922 B2* | 10/2013 | Staedtler | E03C 1/08 |
| | | | 239/553.3 |
| 2012/0251378 A1 | 10/2012 | Abe et al. | |
| 2015/0028138 A1* | 1/2015 | Dubois | F26B 21/004 |
| | | | 239/597 |
| 2015/0174823 A1 | 6/2015 | Wiesner et al. | |
| 2016/0136731 A1 | 5/2016 | McMurtry et al. | |
| 2017/0014905 A1 | 1/2017 | Kawada et al. | |
| 2017/0227286 A1* | 8/2017 | Schmit | F26B 21/12 |
| 2018/0236550 A1 | 8/2018 | Herzog | |

FOREIGN PATENT DOCUMENTS

| | | |
|---|---|---|
| JP | 2016-527390 | 9/2016 |
| JP | 2017-020081 | 1/2017 |
| JP | 2017-048407 | 3/2017 |
| WO | 2011/049143 | 4/2011 |
| WO | 2017/102384 | 6/2017 |

OTHER PUBLICATIONS

Written Opinion dated Jan. 22, 2019 in International (PCT) Application No. PCT/JP2018/040346, with English Translation.

* cited by examiner

ADDITIVE MANUFACTURING NOZZLE AND ADDITIVE MANUFACTURING DEVICE

Priority is claimed on Japanese Patent Application No. 2017-210659, filed on Oct. 31, 2017, the content of which is incorporated herein by reference.

BACKGROUND OF THE INVENTION

1. Technical Field

The present invention relates to an additive manufacturing nozzle and an additive manufacturing device.

2. Description of the Related Art

When metallic material powder is melted and sintered with laser light, an additive manufacturing device is used (for example, refer to Japanese Unexamined Patent Application, First Publication No. 2017-48407).

JP 2017-48407 discloses an additive manufacturing device including a chamber, an inert gas supply unit, a fume collector, a stage, a recoater, a lifting unit, and a laser light irradiation unit.

The inert gas supply unit supplies an inert gas into the chamber. The fume collector suctions the inert gas and removes fume. A powder bed on which a metal powder layer is layered formed on an upper surface of the stage.

The recoater forms a metal powder layer by supplying the metal powder to the upper surface side of the stage. The lifting unit moves the stage downward when an article is molded. The laser light irradiation unit molds an article by irradiating the metal powder layer with laser light.

SUMMARY OF THE INVENTION

1. Technical Problem

Meanwhile, if the flow velocity and direction of the inert gas blown out from the inert gas supply unit (a header and a nozzle body) vary in a width direction of the inert gas supply unit, there is a possibility that a difference may occur for each area in the performance of removing turbulence, fume, or sputtering of the metal powder.

Thus, an object of the present invention is to provide an additive manufacturing nozzle and an additive manufacturing device capable of supplying an inert gas having uniform flow velocity to a molding area.

2. Solution to the Problem

In order to solve the above problem, according to the additive manufacturing nozzle related to an aspect of the present invention, provided is a an additive manufacturing nozzle used to supply an inert gas to a molding area within a chamber in which additive manufacturing is performed. The additive manufacturing nozzle includes: a header extending in a width direction of the chamber and which is configured to be supplied the inert gas to the header from the outside; and a nozzle body connecting with the header extending in the width direction and is configured to horizontally blow out the inert gas, which is supplied from the header, to the molding area. The nozzle body has a honeycomb part which is configured to define an inside of the nozzle body into a plurality of flow channels through which the inert gas flows, a blowout part which is disposed downstream of the honeycomb part and which is connected with the honeycomb part in the width direction, the inert gas passed through the plurality of flow channels is led from the honeycomb part to the blowout part, and a porous part that is disposed between the honeycomb part and the blowout part. The porous part has a plurality of openings each having an opening area smaller than a cross-sectional area of the flow channels orthogonal to a flow direction of the inert gas.

According to the present invention, it is provided with the honeycomb part that defines the inside of the nozzle body into the plurality of flow channels through which the inert gas flows, thereby it is possible to reduce the velocity component of the inert gas in a direction perpendicular to the direction in which the flow channels extend to reduce the secondary flow component, such as swirling.

It is provided with the porous part having the plurality of openings having an opening area smaller than the cross-sectional area of the flow channels orthogonal to the flow direction of the inert gas, thereby it is possible to apply resistance to the inert gas passing through the openings to reduce the flow velocity deviation of the inert gas.

It is provided with the above porous part, thereby it is possible to subdivide a flow passage to make the scale of the vortex small to suppress the turbulence of the inert gas.

Hence, it is provided with the above-described honeycomb part and porous part, thereby the inert gas having a uniform flow velocity can be supplied to the molding area.

In the additive manufacturing nozzle according to the aspect of the above present invention, the length of the flow channels may be larger than an equivalent diameter of the flow channels.

In this way, by making the length of the flow channels larger than the equivalent diameter of the flow channels, it is possible to sufficiently reduce the velocity component of the inert gas in the direction perpendicular to the extension direction of the flow channels. Thus, the secondary flow component, such as swirling, can be sufficiently reduced.

According to the additive manufacturing nozzle related to the aspect of the present invention, the porous part may be a porous plate.

In this way, by using the porous plate as the porous part, it is possible to subdivide flow channels. Thus, the scale of the vortex can be made small, and the turbulence of the inert gas can be suppressed.

According to the additive manufacturing nozzle related to the aspect of the present invention, the porous part may be a metallic mesh.

In this way, by using the metallic mesh as the porous part, compared to a case where the porous plate is used, it is possible to make the width of the frame, which defines the plurality of openings, small. Accordingly, since it is possible to make the scale of the vortex even smaller, the turbulence of the inert gas can be further suppressed. The metallic mesh is used as the porous part, thereby it is possible to shorten the distance until the variation of the inert gas resulting from the vortex (wake) attenuates. Accordingly, the length of the blowout part disposed downstream of the porous part can be shortened.

According to the additive manufacturing nozzle related to the aspect of the present invention, the porous part may be a foamed metal.

In this way, by using the foamed metal as the porous part, the same effects as those in the case where the metallic mesh is used can be obtained.

According to the laminate molding nozzle related to the aspect of the present invention, a Separation suppressing part that is configured to couple the header and the honeycomb part to each other may be provided between the header and the honeycomb part, and the honeycomb part may be inclined at an angle smaller than that of the Separation suppressing part.

In this way, by inclining the honeycomb part at an angle smaller than the Separation suppressing part, it is possible to suppress an abrupt change of the flow direction of the inert gas flowing into the plurality of flow channels of the honeycomb part from the Separation suppressing part. Accordingly, a separation of the inert gas in the vicinity of the boundary between the Separation suppressing part and the honeycomb part can be suppressed.

According to the additive manufacturing nozzle related to the aspect of the present invention, the blowout part may have a lower plate part perpendicular with respect to a vertical direction and an upper plate part disposed above the lower plate part, and the upper plate part may be inclined with respect to the lower plate part so that a flow passage cross-sectional area of the flow channels formed within the blowout part is reduced toward a blowout port of the blowout part from the honeycomb part.

By adopting such a configuration, the flow velocity deviation and turbulence of the inert gas can be reduced, and the inert gas can be horizontally blown out to the molding area.

In order to solve the above problem, according to the additive manufacturing device related to an aspect of the present invention, provided is a additive manufacturing device that molds an article by melting and sintering metal powder. The additive manufacturing device includes the additive manufacturing nozzle; a chamber which has a nozzle body insertion opening and an outlet formed at a lower part thereof and in which the nozzle body insertion opening and the outlet are disposed to face each other; a stage which has a molding area disposed on an upper surface side thereof and is movable in a vertical direction; a recoater that is provided within the chamber and supplies metal powder to an upper surface of the stage; and a laser irradiation unit that is configured to melt the metal powder by irradiating the metal powder deposited on the upper surface of the stage with laser light. A nozzle body of the additive manufacturing nozzle may be disposed in the nozzle body insertion opening.

Since the additive manufacturing device having such a configuration has the above additive manufacturing nozzle, the inert gas having the uniform flow velocity can be supplied to the molding area.

It is allowed that the inert gas having uniform flow velocity to be supplied to the molding area, thereby the quality of an article molded by the additive manufacturing device can be improved.

3. Advantageous Effects of the Invention

According to the invention, the inert gas having a uniform flow velocity can be supplied to the molding area.

DETAILED DESCRIPTION OF EMBODIMENTS

Hereinafter, embodiments to which the invention is applied will be described in detail with reference to the drawings.

Embodiments

An additive manufacturing device 10 according to an embodiment of the invention will be described with reference to FIGS. 1 to 5.

Figure 1:
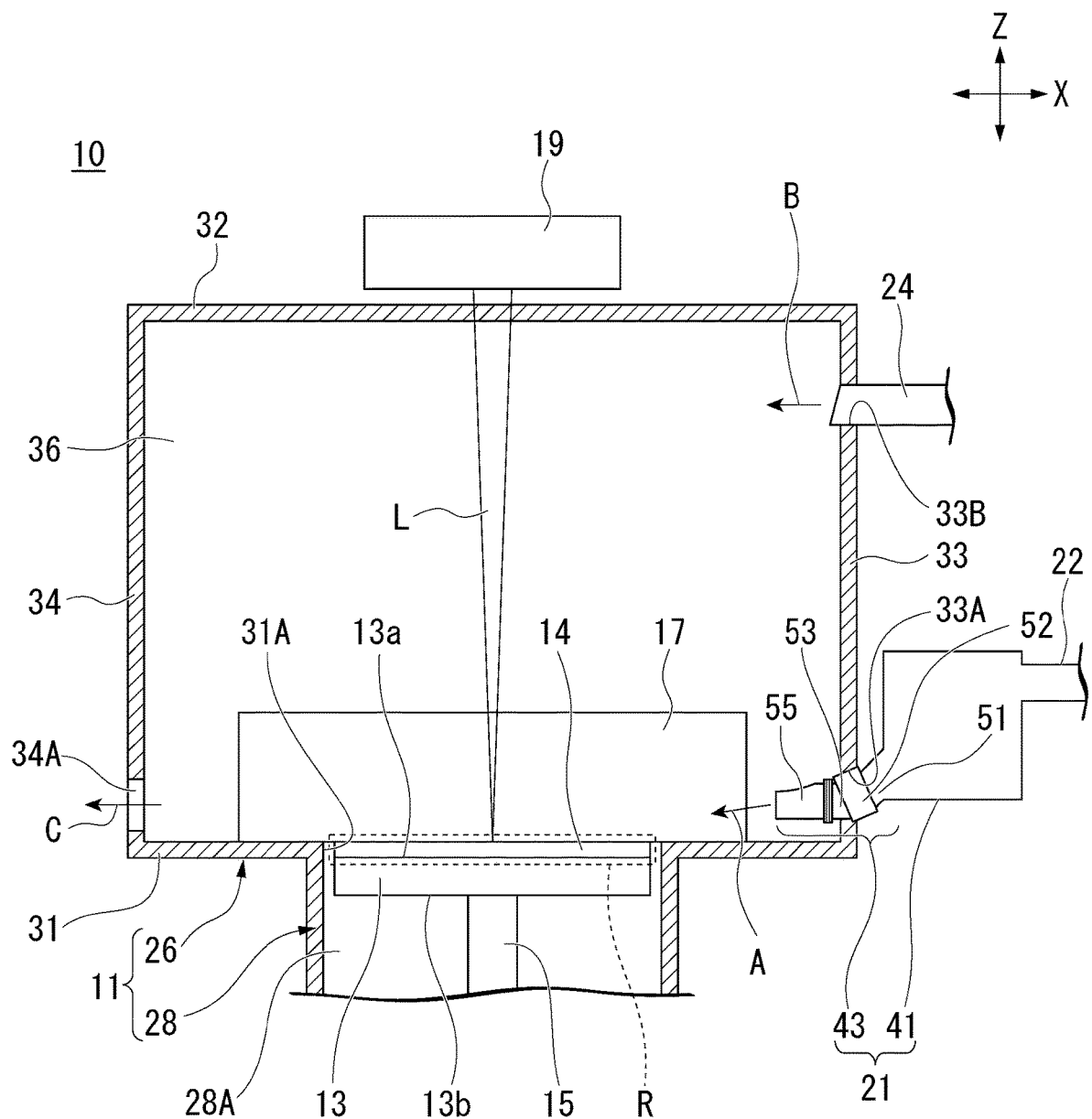
FIG. 1 is a sectional view schematically showing a schematic configuration of a additive manufacturing device according to an embodiment of the invention.

In FIG. 1, A indicates a movement direction (hereinafter referred to as an "A direction") of an inert gas blown out from a first additive manufacturing nozzle 21, B indicates a movement direction (hereinafter referred to as a "B direction") of the inert gas blown out from a second additive manufacturing nozzle 24, and C indicates a movement direction (hereinafter referred to as a "C direction") of the inert gas, metal vapor (also referred to as "fume"), and metal scattering (also referred to as "sputtering") that are discharged from a chamber body 26 of a chamber 11.

Figure 2:
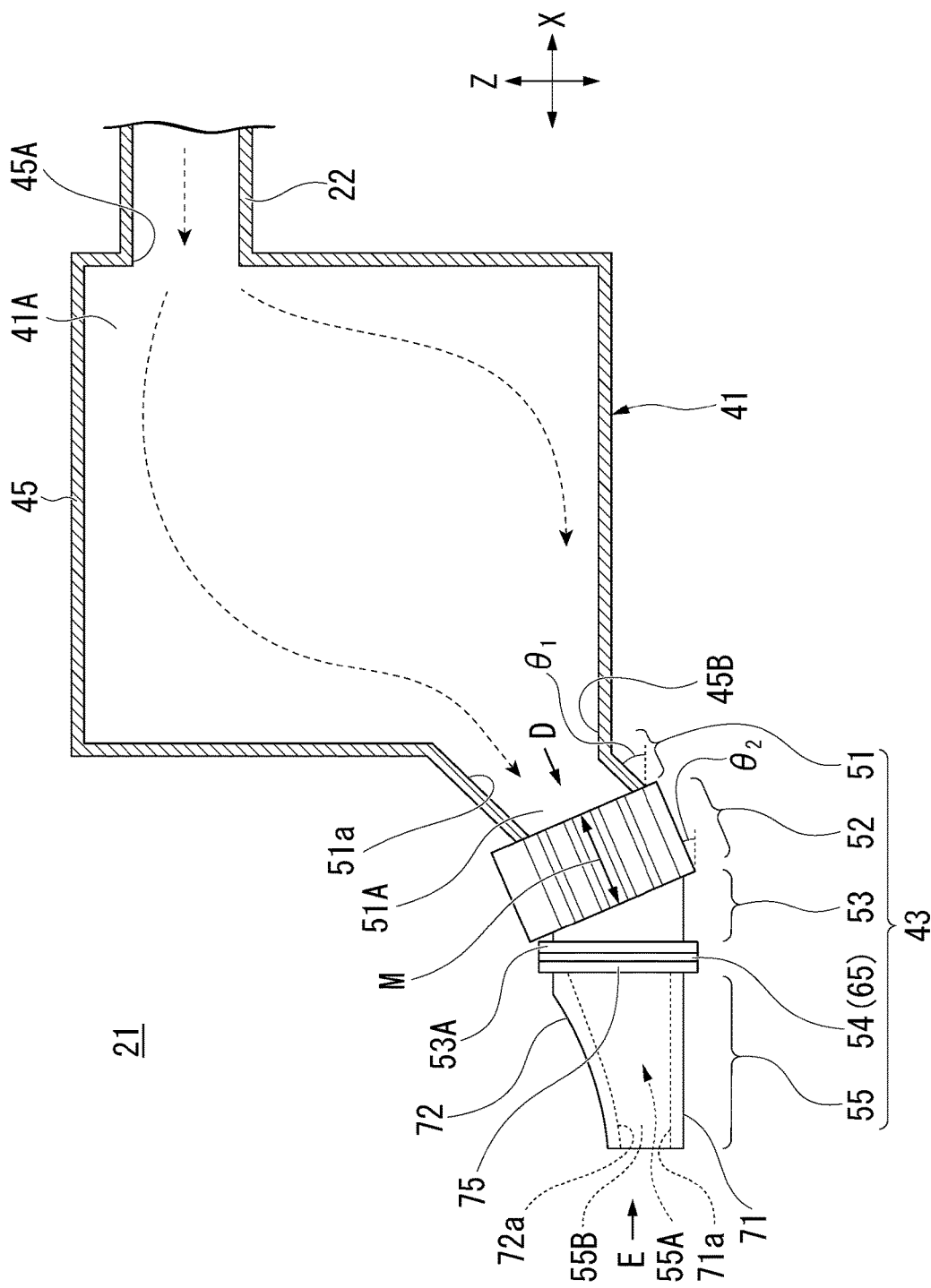
FIG. 2 is an enlarged view of a first additive manufacturing nozzle shown in FIG. 1, and is a view showing only a header and a Separation suppressing part in a section.

In FIG. 2, $\theta_1$ indicates an inclination angle (hereinafter referred to as an "angle $\theta_1$") of the Separation suppressing part 51 with respect to an XY plane (a plane including an X direction and a Y direction).

In addition, in FIG. 2, $\theta_2$ is an inclination angle (hereinafter referred to as an "angle $\theta_2$") of a honeycomb part 52 with respect to an XY plane (the plane including the X direction and the Y direction), and M indicates the length of a flow passage 62 shown in FIG. 3.

Figure 4:
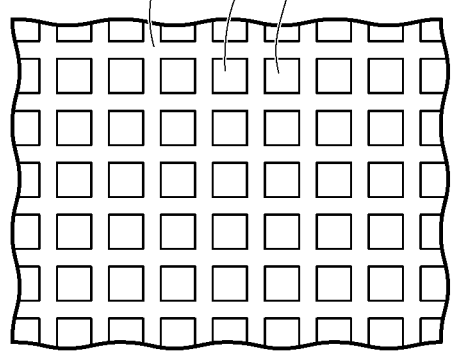
FIG. 4 is a view of a porous part, shown in FIG. 2, as viewed from direction E.
Figure 4:
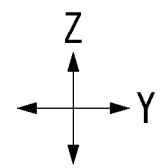
Figure 5:
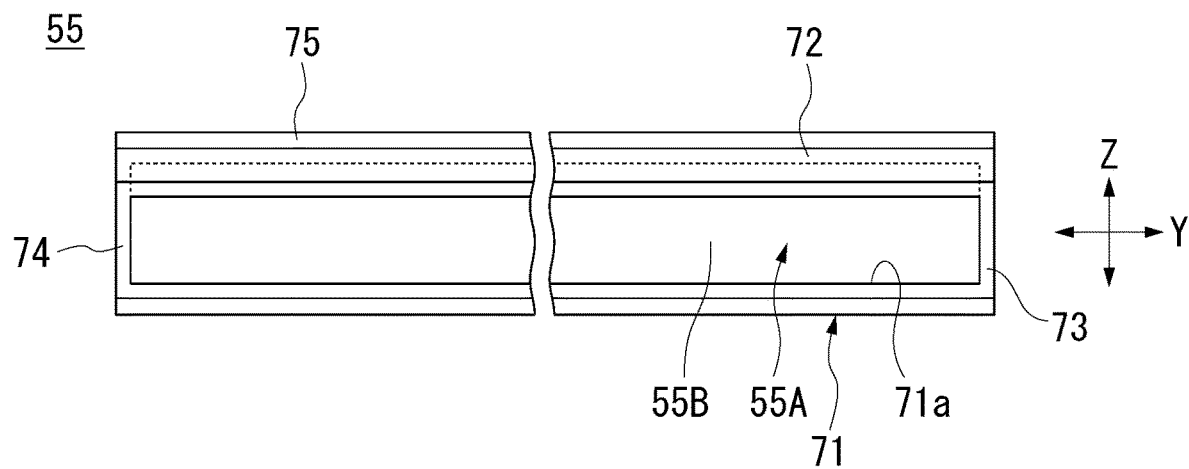
FIG. 5 is a view of a blowout part, shown in FIG. 2, as viewed from direction E.

In FIG. 2, the same constituent portions as those of a structure shown in FIG. 1 will be denoted by the same reference numerals. In FIGS. 3 to 5, the same constituent portions as those of a structure shown in FIG. 2 will be denoted by the same reference numerals.

In FIGS. 1 to 5, a Z direction indicates the vertical direction. The X direction shown in FIGS. 1 and 2 is a direction orthogonal to the Z direction, and indicates a direction in which the nozzle body insertion opening 33A formed in the chamber 11 shown in FIG. 1 and the outlet 34A face each other. The Y direction shown in FIGS. 3 to 5 indicates a width direction of the chamber 11 orthogonal to the X direction and the Z direction.

The additive manufacturing device 10 has a chamber 11, a stage 13, a support member 15, a lifting drive unit (not shown), a recoater 17, a laser irradiation unit 19, a first additive manufacturing nozzle 21, a first inert gas supply line 22, a second additive manufacturing nozzle 24, and a second inert gas supply line (not shown).

The chamber 11 has a chamber body 26 and a lifting mechanism accommodating part 28. The chamber body 26 has a bottom plate 31, a top plate 32, side plates 33 and 34, and a space 36.

The bottom plate 31 has an opening 31A for accommodating the stage 13 formed at a central part thereof.

The top plate 32 is disposed above the bottom plate 31 in a state where the top plate is spaced apart from the bottom plate 31. The top plate 32 faces the bottom plate 31 in the Z direction. The top plate 32 has a window capable of transmitting laser light L.

The side plates 33 and 34 are provided between the bottom plate 31 and the top plate 32. The side plates 33 and 34 are disposed to face each other in the X direction. Lower ends of the side plates 33 and 34 are respectively connected to an outer peripheral edge of the bottom plate 31. Upper ends of the side plates 33 and 34 are respectively connected to an outer peripheral edge of the top plate 32.

Nozzle body insertion openings 33A and 33B are formed in the side plate 33. The nozzle body insertion opening 33A is formed so as to penetrate a lower part (specifically, a portion close to the bottom plate 31) of the side plate 33. The nozzle body insertion opening 33A extends in the Y direction.

The nozzle body insertion opening 33B is formed so as to penetrate an upper part (specifically, a portion close to the top plate 32) of the side plate 33. The nozzle body insertion opening 33B extends in the Y direction.

The outlet 34A is formed in the side plate 34. The outlet 34A penetrates a lower part (specifically, a portion close to the bottom plate 31) of the side plate 34 and is formed so as to face the nozzle body insertion opening 33A. Accordingly, the outlet 34A extends in the Y direction.

The outlet 34A is an opening through which the inert gas, the metal vapor (also referred to as the "fume"), and the metal scattering (also referred to as the "sputtering") are delivered to the outside of the chamber body 26.

In addition, a pair of side plates (not shown) is disposed to face each other in the Y direction. The pair of side plates is connected to the bottom plate 31, the top plate 32, and the side plates 33 and 34. The pair of side plates defines the space 36 together with the bottom plate 31, the top plate 32, and the side plates 33 and 34. Additive manufacturing is performed in the space 36.

The lifting mechanism accommodating part 28 is formed in a tubular shape and is disposed below the chamber body 26. An upper end of the lifting mechanism accommodating part 28 is connected to an inner edge of the bottom plate 31. The lifting mechanism accommodating part 28 defines a columnar space 28A inside. The columnar space 28A is sized to be capable of accommodating the stage 13.

The stage 13 is a plate-shaped member and has an upper surface 13a and a lower surface 13b. The upper surface 13a is a flat surface. On the upper surface 13a, a plurality of layers (hereinafter referred to as a "metal powder layer") on which metal powder is deposited are laminated to form a powder-laminated part 14 including a plurality of metal powder layers. The powder-laminated part 14 is a material for forming an article.

The stage 13 moves downward by the thickness of a layer on which the metal powder is deposited in a step in which the metal powder layer is irradiated with the laser light L and the metal powder is melted and sintered. Then, the stage moves downward by the thickness of the metal powder layer in a step in which the metal powder layer is irradiated with the laser light L, the metal powder is melted, and the metal powder is sintered after a new metal powder layer is laminated.

That is, the stage 13 gradually moves downward as machining caused by the laser light L proceeds.

A molding area R where the article is formed is disposed on the upper surface 13a of the stage 13 and in a region thereabove.

The support member 15 extends downward (Z direction) of the stage 13 in a state where one end is connected to the lower surface 13b side of the stage 13.

The lifting drive unit (not shown) is a drive unit for moving the support member 15 in the Z direction.

The recoater 17 is accommodated within the chamber body 26. The recoater 17 is disposed above the bottom plate 31. The recoater 17 is configured to be movable in a depth direction (Y direction shown in FIGS. 3 to 5) shown in FIG. 1.

The recoater 17 forms the metal powder layer by dropping the metal powder onto the molding area R on the stage 13 while moving in the Y direction. The recoater 17 stands by outside the molding area R during the irradiation with the laser light L.

The laser irradiation unit 19 is disposed above the top plate 32. The laser irradiation unit 19 irradiates the metal powder layer formed on the upper surface 13a of the stage 13 with the laser light L to melt the metal powder. The melted metal powder becomes a portion of the article by being hardened.

In FIG. 1, although a case where the laser irradiation unit 19 is disposed outside the chamber body 26 (specifically, above the top plate 32) has been described as one of variations, the laser irradiation unit 19 may be disposed within the chamber body 26 (space 36).

The first additive manufacturing nozzle 21 has a header 41 and a nozzle body 43.

The header 41 has a header body 45, a gas inlet 45A, and a gas outlet 45B.

The header body 45 is a member having a tubular shape and extends in the Y direction. A columnar space 41A, which extends in the Y direction, is formed inside the header body 45.

The gas inlet 45A is formed in the portion of the header body 45 connected to the first inert gas supply line 22. The gas inlet 45A is formed so as to extend in the Y direction.

The inert gas supplied by the first inert gas supply line 22 is introduced into the gas inlet 45A.

The gas outlet 45B is formed in the header body 45 located opposite to the gas inlet 45A. The gas outlet 45B is formed so as to extend in the Y direction. The gas outlet 45B is connected to the nozzle body 43.

The gas outlet 45B delivers the inert gas introduced into the columnar space 41A to the nozzle body 43.

The nozzle body 43 is fixed to the side plate 33 in a state where the nozzle body is inserted into the nozzle body insertion opening 33A.

The nozzle body 43 has the Separation suppressing part 51, the honeycomb part 52, a coupling part 53, a porous part 54, and a blowout part 55.

The Separation suppressing part 51 is provided between the header body 45 and the honeycomb part 52. The Separation suppressing part 51 has one end connected to the header body 45 and the other end connected to the honeycomb part 52. The Separation suppressing part 51 extends in the Y direction. A space 51A formed within the Separation suppressing part 51 connects with a plurality of the flow channels 62 within the honeycomb part 52, and the columnar space 41A.

The Separation suppressing part 51 is a path for guiding the inert gas, which is delivered from the gas outlet 45B, to the honeycomb part 52.

The Separation suppressing part 51 extends in a direction inclined at the angle $\theta_1$ with respect to the XY plane.

The honeycomb part 52 is provided between the Separation suppressing part 51 and the coupling part 53. The honeycomb part 52 has one end connected to the Separation suppressing part 51 and the other end connected to the coupling part 53.

The honeycomb part 52 is inclined at the angle $\theta_2$ with respect to the XY plane. The honeycomb part 52 extends in the Y direction.

The honeycomb part 52 has a frame part 61, and the plurality of flow channels 62 defined by the frame part 61. The plurality of flow channels 62 extend in a direction from the Separation suppressing part 51 toward the coupling part 53 in a state where the flow channels are inclined at the angle $\theta_2$.

The plurality of flow channels 62 connect with the space 51A and a space (not shown) formed in the coupling part 53. The inert gas, which has passed through the Separation suppressing part 51, is introduced into the plurality of flow channels 62. The inert gas, which has passed through the flow channels 62, is delivered into the coupling part 53.

It is provided with the honeycomb part 52 having such a configuration, thereby it is possible to reduce the velocity component of the inert gas in the direction perpendicular to a direction in which the flow channels 62 extends to reduce a secondary flow component, such as swirling.

The length M of the flow channels 62 may be larger than, for example, the equivalent diameter of the flow channels 62. In this way, by making the flow length M of the flow channels 62 larger than the equivalent diameter of the flow channels 62, the velocity component of the inert gas in the direction perpendicular to the extension direction of the flow channels can be sufficiently reduced, and the secondary flow component, such as swirling, can be sufficiently reduced.

The angle $\theta_2$, which is the inclination angle of the honeycomb part 52, may be smaller than, for example, the angle $\theta_1$ that is the inclination angle of the Separation suppressing part 51.

In this way, by inclining the honeycomb part 52 at an angle smaller than the Separation suppressing part 51, it is possible to suppress an abrupt change in the flow direction of the inert gas flowing into the plurality of flow channels 62 of the honeycomb part 52 from the Separation suppressing part 51. That is, it is possible to gradually make the flow of the inert gas horizontal. Accordingly, the turbulence or loss of the inert gas in the vicinity of the boundary between the Separation suppressing part 51 and the honeycomb part 52 can be suppressed.

It is provided with the honeycomb part 52 with a function as a guide vane, thereby a space saving can be realized.

Figure 3:
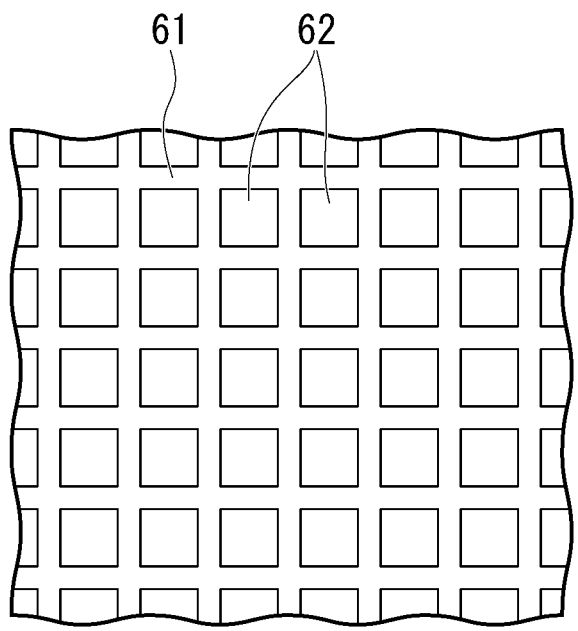
FIG. 3 is a view of a honeycomb part, shown in FIG. 2, as viewed from direction D.
Figure 3:
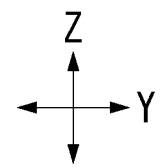

In FIG. 3, although a case where the plurality of flow channels 62 has a quadrangular prism shape has been described as another of the variations, the flow channels 62 is not limited to this. As the shape of the plurality of flow channels 62, for example, a columnar shape, the shape of a hexagonal columnar shape, or the like may be used.

The coupling part 53 extends in the X direction and is provided between the honeycomb part 52 and the porous part 54. The coupling part 53 has one end connected to the honeycomb part 52. The coupling part 53 has a flange part 53A disposed on the other end side. The coupling part 53 supplies the inert gas, which has passed through the honeycomb part 52, to the porous part 54.

The porous part 54 is provided downstream of the honeycomb part 52. The porous part 54 is fixed in a state where the porous part is sandwiched between the flange part 53A of the coupling part 53 and a flange part 75 of the blowout part 55. The porous part 54 is disposed between the honeycomb part 52 and the blowout part 55. As the porous part 54, for example, it is possible to use a porous plate 65 having a plurality of openings 67 defined by the frame part 68. The plurality of openings 67 has an opening area smaller than the cross-sectional area of the flow channels 62 orthogonal to the flow direction of the inert gas.

The inert gas supplied to the porous plate 65 passes through the openings 67, and then, is delivered to the blowout part 55.

In this way, by using the porous plate 65 having the above configuration as the porous part 54, it is possible to apply a resistance to the inert gas passing through the openings 67 formed in the porous plate 65. Accordingly, the flow velocity deviation of the inert gas can be reduced.

Since the porous plate 65 has the plurality of openings 67 having an opening area smaller than the cross-sectional area of the flow channels 62 orthogonal to the flow direction of the inert gas, it is possible to subdivide flow channels. Thus, the scale of the vortex can be made small, and the turbulence of the inert gas can be further suppressed.

The blowout part 55 is disposed downstream of the porous part 54. The blowout part 55 has a flow passage 55A through which the inert gas, which has passed through the porous part 54, flows, and a blowout port 55B that blows out the inert gas, which has passed through the flow passage 55A, into the chamber body 26.

The flow passage 55A extends without any partitions in the Y direction. That is, only one flow passage 55A is present.

The blowout port 55B which connects with the flow passage 55A extends without any partitions in the Y direction. That is, only one blowout port 55B is present.

The blowout part 55 has a lower plate part 71, an upper plate part 72, and side plate parts 73 and 74 that define the flow passage 55A and the blowout port 55B, and a flange part 75.

The lower plate part 71 has an upper surface 71a orthogonal to the Z direction.

The upper plate part 72 is disposed above the lower plate part 71. The upper plate part 72 is inclined with respect to the lower plate part 71 so as to reduce the flow cross-sectional area of the flow passage 55A from the honeycomb part 52 toward the blowout port 55B of the blowout part 55.

The upper plate part 72 has a lower surface 72a that is inclined with respect to the upper surface 71a of the lower plate part 71 and defines upper surface sides of the flow passage 55A and the blowout port 55B.

It is provided with the blowout part 55 having the above configuration, thereby the inert gas can be horizontally blown out to the molding area R.

The side plate part 73 is disposed so as to couple one ends of the lower plate part 71 and the upper plate part 72 in the Y direction to each other. The side plate part 74 is disposed so as to couple the other ends of the lower plate part 71 and the upper plate part 72 in the Y direction to each other.

The side plate parts 73 and 74 are disposed to face each other in a state where the side plate parts are separated from each other in the Y direction.

The flange part 75 is provided at an end of the side where the porous part 54 is disposed. The flange part 75 is a portion for disposing the porous part 54 between the flange part 75 and the flange part 53A.

Next, the first inert gas supply line 22 will be described with reference to FIGS. 1 and 2.

The first inert gas supply line 22 has one end connected to an inert gas supply source (not shown) and the other end connected to the gas inlet 45A.

The first inert gas supply line 22 is a line for guiding the inert gas, which is supplied from the inert gas supply source, to the columnar space 41A.

The second additive manufacturing nozzle 24 is inserted into the nozzle body insertion opening 33B. The second additive manufacturing nozzle 24 is connected to the second inert gas supply line. The second additive manufacturing nozzle 24 blows out the inert gas in the horizontal direction (B direction). The second additive manufacturing nozzle 24 blows out the same type of inert gas as the nozzle body 43.

The second inert gas supply line is connected to an inert gas supply source (not shown). The second inert gas supply line is a line for guiding the inert gas, which is supplied from the inert gas supply source, to the second additive manufacturing nozzle 24.

According to the first additive manufacturing nozzle 21 of the present embodiment, it is provided with the honeycomb part 52 that defines the inside of the nozzle body 43 into the plurality of flow channels 62 through which the inert gas flows, thereby it is possible to reduce the velocity component of the inert gas in the direction perpendicular to the direction in which the flow channels 62 extend to reduce the secondary flow component, such as swirling.

It is provided with the porous part 54 having the plurality of openings 67 having an opening area smaller than the cross-sectional area of the flow channels 62 orthogonal to the flow direction of the inert gas, thereby it is possible to apply resistance to the inert gas passing through the openings 67 to reduce the flow velocity deviation of the inert gas.

It is provided with the above porous part 54, thereby it is possible to subdivide a flow passage and make the scale of the vortex small to suppress the turbulence of the inert gas.

Hence, it is provided with the above-described honeycomb part 52 and porous part 54, thereby the inert gas having a uniform flow velocity can be supplied to the molding area.

According to the additive manufacturing device 10 of the present embodiment, it is provided with the first additive manufacturing nozzle 21, thereby the inert gas having the uniform flow velocity can be supplied to the molding area R.

It is allowed that the inert gas having uniform flow velocity to be supplied to the molding area R, thereby the quality of an article molded by the additive manufacturing device 10 can be improved.

Figure 6:
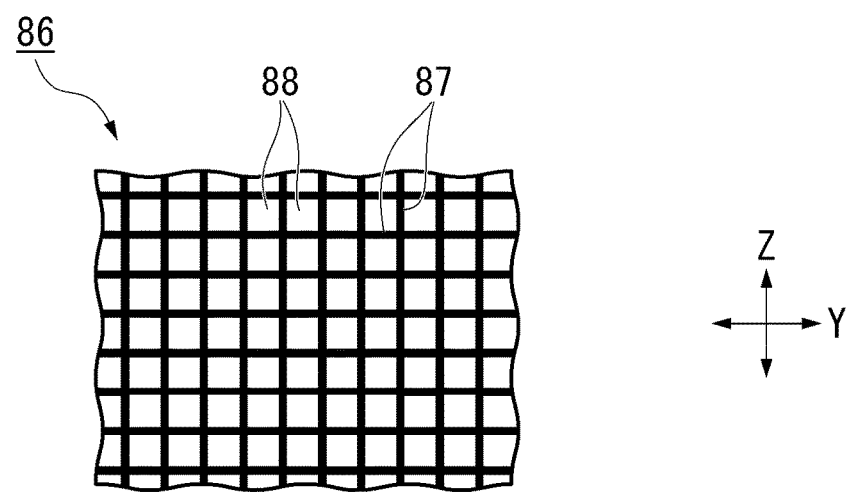
FIG. 6 is a plan view of another porous part.

Here, another variations of other porous parts will be described with reference to FIG. 6. Instead of the porous part 54 described previously, a metallic mesh 86 may be used as the porous part. The metallic mesh 86 has a frame body (not shown), and a metal mesh part that is disposed inside the frame body and includes a metal frame 87 and a plurality of openings 88.

The metal frame 87 is formed such that the width thereof is narrower than that of the frame part 68 shown in FIG. 4. The plurality of openings 88 has an opening area smaller than the cross-sectional area of the flow channels 62 (refer to FIG. 3) orthogonal to the flow direction of the inert gas.

By using the metallic mesh 86 having the above configuration, compared to a case where the porous plate 65 is used, it is possible to make the width of the metal frame 87, which defines the plurality of openings 88, small. Accordingly, since it is possible to make the scale of the vortex even smaller, the turbulence of the inert gas can be further suppressed.

Moreover, by using the metallic mesh 86 having the above configuration, it is possible to shorten the distance until the variation of the inert gas resulting from the vortex (wake) attenuates. Accordingly, the length (the length in the X direction) of the blowout part 55 disposed downstream of the metallic mesh 86 can be shortened.

In addition, instead of the metallic mesh 86, a foamed metal may be used as a porous part. In this case, the same effects as those in the case where a metallic mesh is used can be obtained.

Although the preferred embodiments for carrying out the invention have been described above in detail, the invention is not limited to the relevant specific embodiments, and various modifications and changes can be made within the spirit of the invention described in the claims.

The present invention is applicable to the additive manufacturing nozzle and the additive manufacturing device.

REFERENCE SIGNS LIST

10 Additive Manufacturing device
11 Chamber
13 Stage
13a, 71a Upper surface
13b, 72a Lower surface
14 Powder-laminated part
15 Support member
17 Recoater
19 Laser irradiation unit
21 First additive manufacturing nozzle
22 First inert gas supply line
24 Second additive manufacturing nozzle
26 Chamber body
28 Lifting mechanism accommodating part
28A, 41A Columnar space
31 Bottom plate
31A, 67, 88 Opening
32 Top plate
33, 34 side plate
33A, 33B Nozzle body insertion opening
36, 51A Space
41 Header
43 Nozzle body
45 Header body
45A Gas inlet
45B gas outlet
51 Separation suppressing part
51a Inner surface
52 Honeycomb part
53 Coupling part
53A, 75 Flange part
54 Porous part
55 Blowout part
55A, 62 Flow passage
55B Blowout port
61, 68 Frame part
65 Porous plate
71 Lower plate part
72 Upper plate part
73, 74 Side plate part
86 Metallic mesh
87 Metal frame
L Laser light
M Length
$\theta_1$, $\theta_2$ Angle

The invention claimed is:

1. An additive manufacturing nozzle used to supply an inert gas to a molding area within a chamber in which additive manufacturing is performed, the additive manufacturing nozzle comprising:
a header configured to extend in a width direction of the chamber and to be supplied with the inert gas to the header from the outside; and
a nozzle body connecting with the header extending in the width direction, the nozzle body being configured to horizontally blow out the inert gas, which is supplied from the header, to the molding area, wherein the nozzle body has a honeycomb part which is configured to define a plurality of flow channels through which the inert gas flows in an inside of the nozzle body, a blowout part which is disposed downstream of the honeycomb part and which is connected with the honeycomb part in the width direction, the inert gas passed through the plurality of flow channels is led from the honeycomb part to the blowout part, and a porous part that is disposed between the honeycomb part and the blowout part, and wherein the porous part has a plurality of openings through which the inert gas passes, and the porous part is disposed downstream of the honeycomb part along an extension direction of the flow channels of the honeycomb part, and an opening area of each one of the openings of the porous part is smaller than a cross-sectional area of each one of flow channels of the honeycomb part orthogonal to a flow direction of the inert gas, and wherein the nozzle body includes a separation suppressing part, wherein the separation suppressing part is configured to couple the header and the honeycomb part to each other and the separation suppressing part is provided between the header and the honeycomb part, wherein the separation suppressing part is a path, and the separation suppressing part has one end connected to the header and the other end connected to the honeycomb part, and wherein an inclination angle of the honeycomb part with respect to a horizontal direction is smaller than an inclination angle of the separation suppressing part with respect to the horizontal direction.

2. The additive manufacturing nozzle according to claim 1, wherein the length of the flow channels is larger than an equivalent diameter of the flow channels.

3. The additive manufacturing nozzle according to claim 1, wherein the porous part is a porous plate.

4. The additive manufacturing nozzle according to claim 1, wherein the porous part is a metallic mesh.

5. The additive manufacturing nozzle according to claim 1, wherein the porous part is a foamed metal.

6. The additive manufacturing nozzle according to claim 1,
wherein the blowout part has a lower plate part perpendicular to a vertical direction and an upper plate part disposed above the lower plate part, and
wherein the upper plate part is inclined with respect to the lower plate part so that a flow passage cross-sectional area of the flow channels formed within the blowout part is reduced toward an outlet of the blowout part from the honeycomb part.

7. An additive manufacturing device that molds an article by melting and sintering metal powder, comprising:
the additive manufacturing nozzle according to claim 1;
a chamber which has a nozzle body insertion opening and an outlet formed at a lower part thereof and in which the nozzle body insertion opening and the outlet are disposed to face each other;
a stage which has a molding area disposed on an upper surface side thereof and is movable in a vertical direction;
a recoater that is provided within the chamber and supplies metal powder to an upper surface of the stage; and
a laser irradiation unit that is configured to melt the metal powder by irradiating the metal powder deposited on the upper surface of the stage with laser light, wherein the nozzle body of the additive manufacturing nozzle is disposed in the nozzle body insertion opening.

8. An additive manufacturing nozzle used to supply an inert gas to a molding area within a chamber in which additive manufacturing is performed, the additive manufacturing nozzle comprising:
a header configured to extend in a width direction of the chamber and to be supplied with the inert gas to the header from the outside; and
a nozzle body connecting with the header extending in the width direction, the nozzle body being configured to horizontally blow out the inert gas, which is supplied from the header, to the molding area,
wherein the nozzle body has a honeycomb part which is configured to define a plurality of flow channels through which the inert gas flows in an inside of the nozzle body,
a blowout part which is disposed downstream of the honeycomb part and which is connected with the honeycomb part in the width direction, the inert gas passed through the plurality of flow channels is led from the honeycomb part to the blowout part,
a porous part disposed between the honeycomb part and the blowout part, and
a coupling part disposed between the honeycomb part and the porous part,
wherein the porous part has a plurality of openings through which the inert gas passes,
wherein the porous part is disposed downstream of the honeycomb part along an extension direction of the flow channels of the honeycomb part, and
an opening area of each one of the openings of the porous part is smaller than a cross-sectional area of each one of flow channels of the honeycomb part orthogonal to a flow direction of the inert gas, and
the plurality of openings of the porous part opens in the horizontal direction, and the honeycomb portion is inclined with respect to the horizontal direction.

* * * * *